United States Patent
Camargo

(10) Patent No.: US 9,264,532 B2
(45) Date of Patent: Feb. 16, 2016

(54) TECHNOLOGY FOR COMBATING MOBILE PHONE CRIMINAL ACTIVITY

(71) Applicant: International Business Machines Corporation, Amonk, NY (US)

(72) Inventor: Fernando A. Camargo, São Paulo (BR)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 13/756,465

(22) Filed: Jan. 31, 2013

(65) Prior Publication Data

US 2014/0214423 A1 Jul. 31, 2014

(51) Int. Cl.
*G10L 15/04* (2013.01)
*H04M 3/22* (2006.01)
*H04L 29/06* (2006.01)
*H04M 3/42* (2006.01)

(52) U.S. Cl.
CPC .............. *H04M 3/2281* (2013.01); *H04L 63/30* (2013.01); *H04M 3/42221* (2013.01); *H04M 2201/40* (2013.01); *H04M 2201/41* (2013.01); *H04M 2207/18* (2013.01)

(58) Field of Classification Search
USPC .................................. 704/231, 239, 246, 248
See application file for complete search history.

(56) References Cited

U.S. PATENT DOCUMENTS

| | | | |
|---|---|---|---|
| 6,498,843 B1 * | 12/2002 | Cox | 379/207.02 |
| 8,195,198 B1 * | 6/2012 | Shaw et al. | 455/456.4 |
| 2002/0007316 A1 | 1/2002 | Frank | |
| 2003/0012355 A1 * | 1/2003 | Haran | 379/201.11 |
| 2003/0125011 A1 | 7/2003 | Campbell | |
| 2004/0116842 A1 * | 6/2004 | Mardirossian | 604/1 |
| 2004/0181463 A1 | 9/2004 | Goldthwaite | |
| 2006/0069654 A1 | 3/2006 | Beach | |
| 2006/0093135 A1 * | 5/2006 | Fiatal et al. | 380/28 |
| 2007/0286389 A1 * | 12/2007 | Hyerle et al. | 379/207.01 |

(Continued)

FOREIGN PATENT DOCUMENTS

AU 2008101033 A4 11/2008
WO WO 2004023353 A1 * 3/2004

OTHER PUBLICATIONS

Kokko, Juha, "Mobile Internet Charging: *Prepaid* vs. *Postpaid*," http://www.netlab.tkk.fi/opetus/s38042/k03/topics/preandpostpaid.pdf, Networking Laboratory, HUT, Published Aug. 2002.

(Continued)

*Primary Examiner* — Richard Zhu
(74) *Attorney, Agent, or Firm* — Anthony V. S. England

(57) ABSTRACT

Technology for crime control includes receiving a voucher identifier for a mobile phone credit voucher purchased under duress by a victim and generating a request for a legal order directing a telecommunication service provider to obtain certain information about use of the voucher. Approval for the legal order is received and the legal order and the voucher identifier are transmitted by a law enforcement agency computer system via a network to a computer system of the telecommunication service provider. A phone number associated with a mobile phone to which a credit associated with the voucher identifier was applied and a recording of a telephone call to or from the phone number are received via the network from the telecommunication service provider computer system and the law enforcement agency computer system performs an automated analysis of the call by a voice recognition process.

18 Claims, 5 Drawing Sheets

(56) References Cited

U.S. PATENT DOCUMENTS

| | | | |
|---|---|---|---|
| 2008/0095342 A1* | 4/2008 | Imbimbo et al. | 379/112.01 |
| 2008/0201143 A1* | 8/2008 | Olligschlaeger et al. | 704/235 |
| 2008/0312924 A1* | 12/2008 | De Los Reyes et al. | 704/246 |
| 2012/0171986 A1* | 7/2012 | Jeong et al. | 455/404.1 |
| 2014/0058723 A1* | 2/2014 | Shen et al. | 704/9 |
| 2014/0088965 A1* | 3/2014 | Goel | 704/246 |

OTHER PUBLICATIONS

Brown, Stephen, "Telecommunication Fraud Management," http://waveroad.ca/ressources/Whitepaper_SB_Janvier2005.pdf, Published Jan. 2005.

"Zero Tolerance," Wikipedia Foundation, downloaded Sep. 10, 2012, http://en.wikipedia.org/wiki/Zero_Tolerance.

"Honeypot (computing)," Wikipedia Foundation, downloaded Sep. 10, 2012, http://en.wikipedia.org/wiki/Honeypot_(computing).

* cited by examiner

TECHNOLOGY FOR COMBATING MOBILE PHONE CRIMINAL ACTIVITY

BACKGROUND

Mobile phones allow communication services to a larger group of people around the world and are particularly popular in countries with poor wired telephone services. A credit voucher may be purchased and applied to a mobile phone account for payment of phone service on the account.

SUMMARY

According to embodiments of the present invention, a method for crime control includes receiving a voucher identifier for a mobile phone credit voucher purchased under duress by a victim and generating a request for a legal order directing a telecommunication service provider to obtain certain information about use of the voucher. Approval for the legal order is received and the legal order and the voucher identifier are transmitted by a computer system for a law enforcement agency via a network to a computer system of the telecommunication service provider. A phone number associated with a mobile phone to which a credit associated with the voucher identifier was applied and a recording of a telephone call to or from the phone number are received via the network from the telecommunication service provider computer system and the law enforcement agency computer system performs an automated analysis of the call by a voice recognition process.

In another aspect, the method includes presenting an alert by the law enforcement agency computer system responsive to the automated analysis.

In another aspect, presenting the alert includes presenting the alert responsive to the automated analysis identifying at least specific words indicating that the call includes information useful for identifying a person who coerced the victim to purchase the identified credit voucher.

In another aspect, the method includes presenting, by the law enforcement agency computer system responsive to the automated analysis, at least specific words indicating that the call includes information useful for apprehending a person who coerced the victim to purchase the identified credit voucher.

In another aspect, presenting the alert includes identifying a plurality of calls from the mobile phone for the account to which the credit associated with the voucher identifier was applied.

In another aspect, the method includes receiving from the telecommunication service provider an International Mobile Station Equipment Identity number of the mobile phone to which the credit associated with the voucher identifier was applied.

In another aspect, the method includes communicating to other telecommunication service providers authorization to disable the mobile phone having the identified International Mobile Station Equipment Identity number.

In other forms of the invention, computer program products and systems are provided.

BRIEF DESCRIPTION OF THE DRAWINGS

Novel features believed characteristic of the invention are set forth in the appended claims. The invention itself, however, as well as a preferred mode of use, further objectives and advantages thereof, will best be understood by reference to the following detailed description of one or more illustrative embodiments when read in conjunction with the accompanying drawings, wherein:

DETAILED DESCRIPTION

Figure 1:
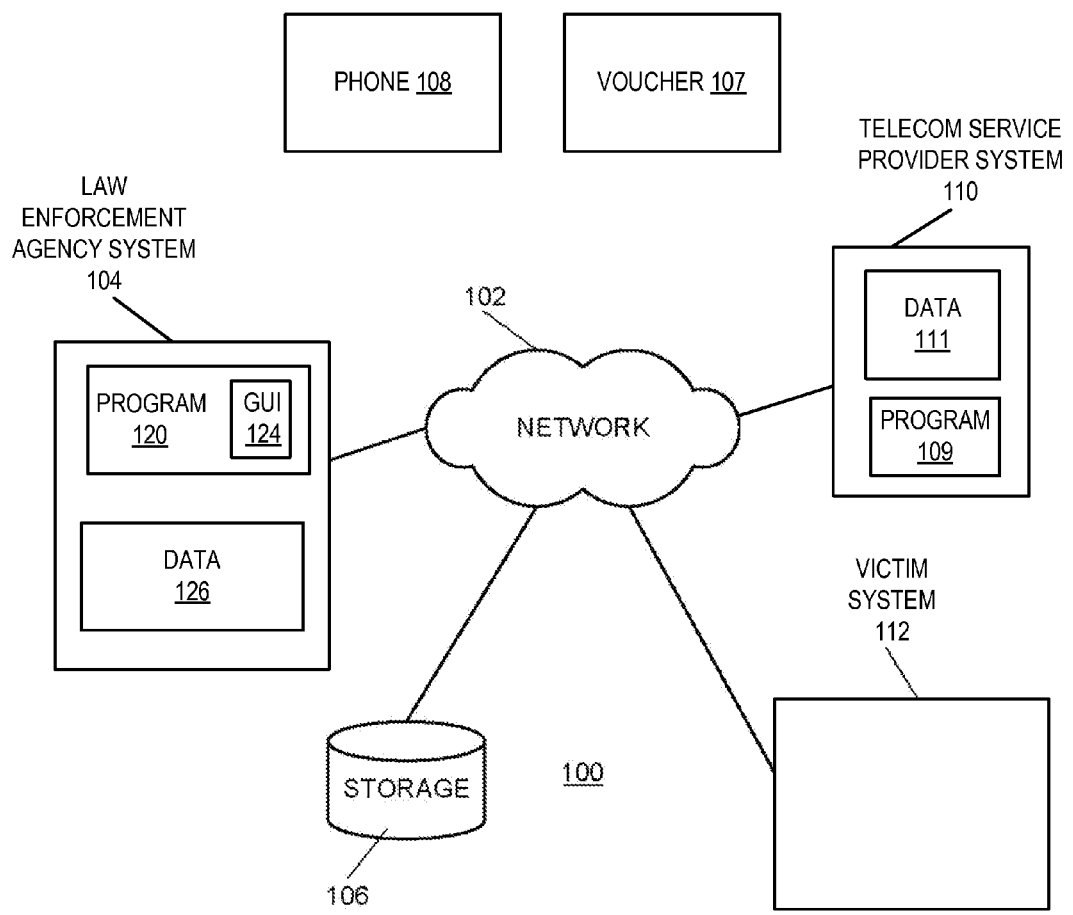
FIG. 1 depicts a pictorial representation of a network of data processing systems in which embodiments of the invention may be implemented.

Descriptions of various embodiments of the invention are herein presented for purposes of illustration, but are not intended to be exhaustive or limited to the embodiments disclosed. Many modifications and variations will be apparent to those of ordinary skill in the art without departing from the scope and spirit of the described embodiments. Terminology used herein was chosen to best explain the principles of the embodiments, the practical application or technical improvement over technologies found in the marketplace, or to enable others of ordinary skill in the art to understand the embodiments disclosed herein.

As previously mentioned, a credit voucher may be purchased and applied to a mobile phone account for payment of phone service on the account. Mobile phones are sometimes used for criminal enterprises since they do not establish a fixed location where a user may be apprehended by law enforcement agents. Further, prepaid mobile phone plans may allow still greater anonymity, making them even more useable for crime.

In prepaid mobile phone plans, a customer pays in advance to get the right to use some specific set of communication services. This service option allows better control of the communication expenses, helping the customer with budget restriction. To sell the telecommunication services, the provider offers vouchers with a predefined number of minutes each service can be used. The voucher can be purchased at convenience stores, ATMs, on the Internet, etc. The vouchers may be sold using an approach similar to scratch lottery tickets, in which no customer identification is provided to the seller. This anonymity has been used by criminals and terrorists to facilitate illegal transactions.

In one criminal scheme, a criminal uses a prepaid mobile phone to get voucher credit by calling and making threats to potential victims, which may include simulating the kidnapping of a beloved family member (like a son or daughter). In these phone attacks, the criminal tries to coerce a victim to buy voucher credit for the prepaid mobile phone account. The criminal might use a list of phone numbers of potential victims obtained from personal information widely available on the Internet, such as social networking sites, for example. Another way a criminal may obtain information regarding a potential victim is by inquiring with others about the victim face-to-face or by phone.

To start a fake kidnapping, a criminal may phone the victim's home and speak to the victim who answers the phone in a voice briefly simulating the victim's child, as if the child is saying that they have been kidnapped. Then the same criminal or an accomplice instructs the victim to buy one or more prepaid mobile phone vouchers for the criminal's mobile phone account in exchange for returning the purportedly kidnaped child. If the victim does not have any way to identify the criminal, the victim may comply and purchase the demanded voucher credit for the criminal's phone account. If the victim realizes it is a fake kidnapping or other threat, the victim may refuse, in which case the criminal has not spent much time or exposed his or her identify and may easily and quickly try another phone number, potentially repeating the process many time and sometimes succeeding in coercing the victim to comply.

Regardless of whether the victim complies, if the victim contacts law enforcement to report the problem, it is complicated and time consuming for law enforcement representatives to help. Consequently, the criminal may remain free, which leaves the victim feeling powerless and unsafe.

FIG. 1 provides a pictorial representation of a network of data processing systems (also referred to as "computer systems") is depicted in which embodiments of the invention may be implemented and is intended as an example, not as an architectural limitation. Network data processing system 100 is a network of computer systems in which embodiments of the invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, one of the computer systems 104 is connected to network 102 along with storage unit 106. In addition, other computer systems 110 and 112 are depicted and are connected to network 102. These systems 110 and 112 may be, for example, personal computers, network computers, smart phones, or other computers. Phone 108 is typically a computer system, likewise.

It should be understood that computer system, such as system 110, for example, may provide data, such as boot files, operating system images, and applications to client systems. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another.

The Internet includes a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN).

As shown, computer programs 120, 109 and 111 for combating criminal activities runs on one or more computer systems 104, 110 and 112. Although computer program 120, for example, is shown on law enforcement computer system 104 in FIG. 1 and may be referred to hereinafter in the singular, it should be understood that it may be a program running on a different system and may be more than one program running on more than one system, wherein various configurations will be apparent in certain instances according to the context of descriptions herein. In one aspect, program 120, for example, provides a graphical user interface (GUI) 124 to a current user. Program 120 receives data input from users and systems, which may include information from systems such as system 112 of victims and telephone service provider system 110. In embodiments of the present invention, program 120 presents information to law enforcement representatives helpful to document a crime and to find and apprehend criminals.

A credit voucher 107 for a prepaid mobile phone has a unique identifier, which may be a string of numbers, other characters or combination thereof. A telecommunication service provider system such as system 110 generally runs a management application 120 to control voucher usage, wherein a database 111 maintains records of respective voucher 107 identifiers that uniquely identify each voucher, so that when credit for a voucher 107 is applied it cannot be applied a second time. To facilitate this control, phone 108 user must type the identifier into phone 108 to identify the voucher credit, which phone 108 then communicates to the telecommunication service provider system 110, so that system 110 may then validate the voucher identifier by comparing it to records in a telephone service provider database 111 to determine if it corresponds to an identifier for an unused voucher and may apply the credit for voucher 107 to an account maintained by system 110 for phone 108. (Applying credit to the account for phone 108 may be referred to as "charging up" the phone.)

In embodiments of the present invention, a law enforcement agency makes an agreement with a mobile phone service provider to receive prepaid mobile phone voucher 107 identifiers, which the mobile phone service provider reserve and tag for use exclusively in instances wherein a voucher 107 buyer notifies the agency that the buyer is a victim of a criminal scheme and is purchasing the voucher under duress, such as due to a threat of harm as described herein above. In this case, the system 110 may send the reserved voucher 107 identifiers to a computer system 104 provided for purposes of the law enforcement agency. (Herein the term "law enforcement agency computer system" or "law enforcement computer system" is used to indicate that the computer system operates at least partly for purposes related to law enforcement. It should be understood that such a computer system is not necessarily owned or operated by, nor co-located with personnel or facilities of, a law enforcement agency. Nor does it indicate that the system is limited to a computer system in a single location. Rather, parts of the system may be distributed among locations. Moreover, the computer system for the law enforcement agency may include more than a single computer system.) Sending voucher 107 identifiers may include sending the identifiers one at a time, responsive to individual requests, or may include sending a plurality of identifiers in a batch, so that they may be used for later requests.

Figure 4A:
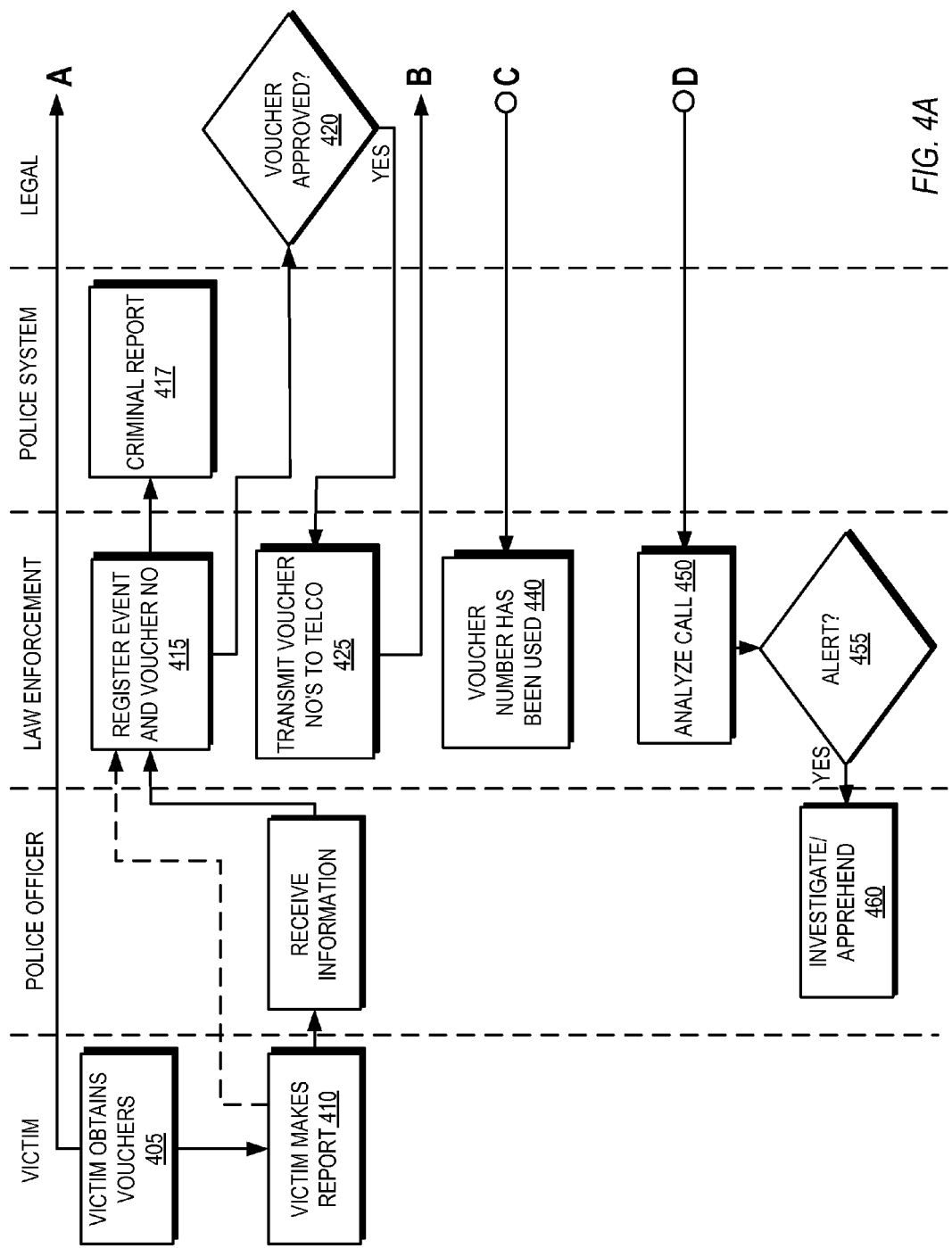
FIG. 4A is an exemplary flowchart illustrating processes, according to one or more embodiments of the invention
Figure 4B:
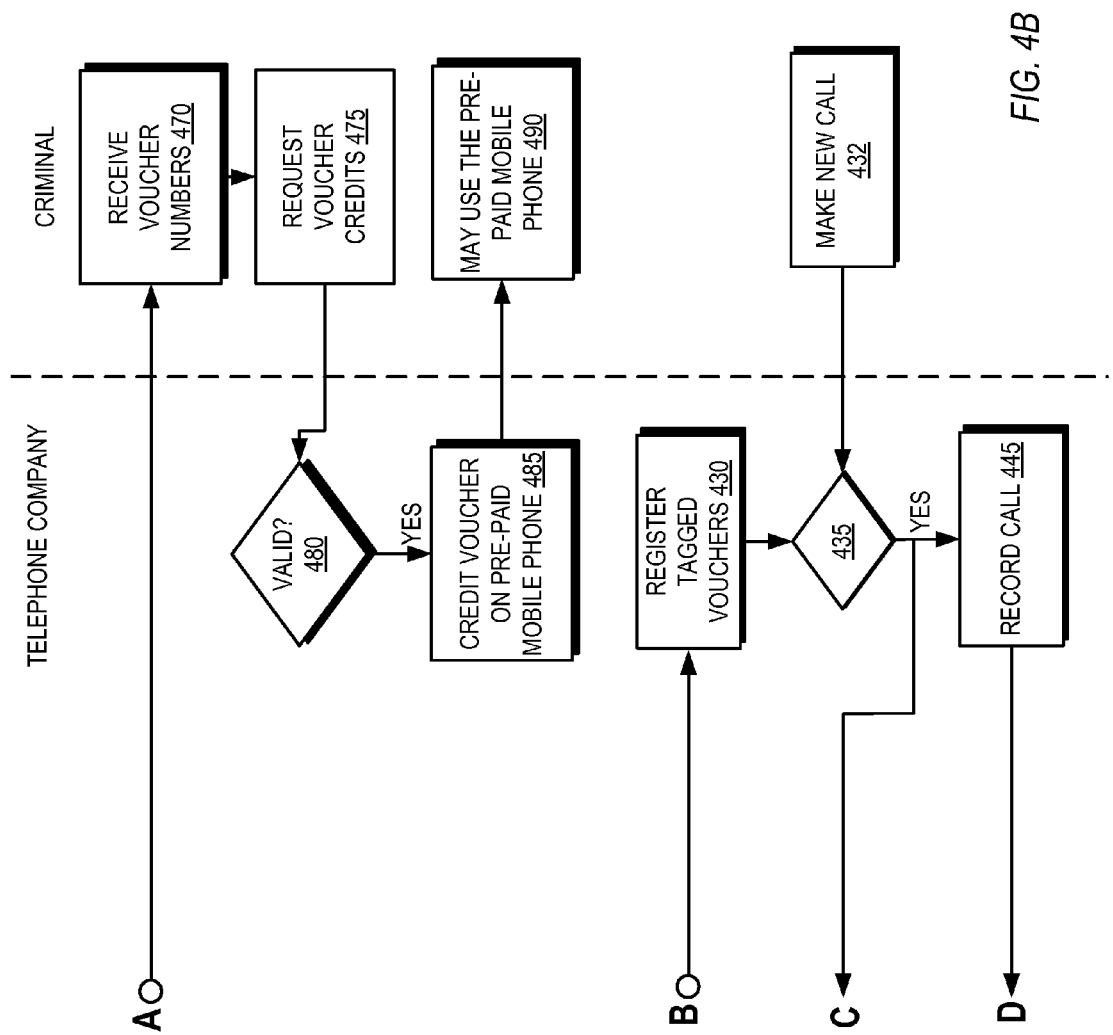
FIG. 4B is an exemplary flowchart illustrating processes, according to one or more embodiments of the invention

Referring to FIG. 4 in connection with FIG. 1, aspects of in embodiments of the present invention are further illustrated. After receiving a threat, a victim purchases 405 prepaid mobile phone vouchers and then communicates 470 the voucher identifiers to the criminal who made the threat, such as to a phone number or an email address given to the victim by the criminal. Where a law enforcement agency has an arrangement with the telephone service provider hosting the account for the criminal's prepaid mobile phone as described herein above, the victim may purchase the credit vouchers from the agency, e.g., via communication 410 with a law enforcement agent or directly with system 104. Otherwise, the victim may purchase them independently, depending on embodiments of the invention.

If the victim purchased 405 credit vouchers independently, the victim then reports 410 to a law enforcement agent the victim's identity, the voucher identifiers that the victim already communicated to the criminal, any phone number or email address given by the criminal, and other information, such as date, time and nature of the coercion experienced by the victim. The agent then records 415 the information provided by the victim in a law enforcement agency registry 126, i.e., a database, such as via a program 120 of system 104. Alternatively, system 104 may be configured with a program 120 that receives 410 the report the victim's identity, the independently purchased voucher identifiers, etc. directly from the victim, such as via network communication from an application on the victim's computer system 112, and enters this into the database 126. Likewise, if the victim purchases 405 the credit vouchers via the law enforcement agency, this reporting 410 may be done via the victim communicating with a law enforcement agent or via direct communication with a program 120 of system 104, depending on embodiments of the invention. In yet another alternative, the victim may report 410 the coercive circumstances of the purchase to the credit voucher seller or the telephone service provider (i.e., a third party) and the third party may receive the victim's identity from the victim and communicate the victim's identity and the voucher identifiers directly or indirectly to the law enforcement agent or program 120 of system 104 on behalf of the victim.

Regardless of how the information concerning victim and voucher identity, etc. is communicated to system 104 and entered into database 126, system 104 program 120 is further configured so that registry process 415 includes tagging the particular voucher identifiers to indicate they have now been purchased under duress by a victim of a threat. Registry process 415 also generates a crime report 417 responsive to the communication 410 from the victim (which has a unique crime report identifier and a cross reference to the voucher identifier(s) that gave rise to the crime report) and is also stored by system 104 in computer readable storage for future reference) and sends the report, including report identifier, as part of a request 420 to an official, such as to a judicial or administrative official, for legal approval authorizing the telephone service provider to take further action, as next described.

In embodiments of the invention, generating the crime report 417 and sending the request for legal approval 420 (responsive to communication 410) is performed only upon the further condition that system 104 receives input indicating a law enforcement agent has reviewed and approved the crime report and legal request actions 417 and 420. If processing of request 420 results in a judicial or administrative official order authorizing legal action, the order is communicated to system 104, which in turn registers the decision, storing it in association with the corresponding voucher identifier(s), and contacts 425 telecommunication service provider, which includes transmitting the legal order and associated voucher identifiers and which may be through a special network gateway connector to telecommunication service provider system 110. In this fashion, the legal authorities provide formal documents the telecommunications provider and provide any other process required by law to allow the local law enforcement department to access relevant telecommunications provider data related to the matter reported by the victim.

When the criminal requests 475 prepaid mobile phone credits from the telecommunication service provider using the voucher identifier provided 470 to the criminal by the victim, the criminal provides a phone number to which the credit of the voucher will be applied and the service provider system 110 validates 480 the voucher identifier by comparing it to records in database 111 to determine if it corresponds to an identifier for a voucher and, if so, to determine whether it has been used yet. If system 110 finds a record corresponding to the voucher identifier and the record indicates the voucher has not already been used, system 110 marks 485 the voucher record in database 111 to indicate its application to the account for the identified phone number, which includes storing the phone number in association with the voucher identifier, and applies the associated voucher credit to the prepaid mobile phone account, which then enables the criminal to spend 490 the credits for phone usage (or other permitted uses).

In response to receiving a voucher identifier and legal order sent 425 by system 104, system 110 stores 430 the voucher identifier in association with the legal order identifier and, at 435, searches its database of records indicating vouchers that have been applied to phone numbers (which was determined in the validating process 480), identifies any phone number thus associated with the identified voucher, updates database 111 to store the association among the phone number, corresponding voucher identifier and legal order identifier, sends the phone number to system 104 along with at least the voucher identifier associated with the phone number and monitors in real time for any new calls originating from or received by such mobile phone number.

In embodiments, system 110 also determines at 435 the International Mobile Station Equipment Identity number of the mobile phone to which the credit associated with the voucher identifier was applied and sends the International Mobile Station Equipment Identity number to law enforcement computer system 104.

Responsive to the monitoring 435 process detecting any call(s) to or from such phone number(s), at 445 system 110 responsively records the call(s) and sends the recording(s) to system 104 along with at least the associated voucher identifier or phone number. Alternatively, system 110 finds one or more existing call recordings received by or originating from such mobile phone number and responsively sends the existing recording(s) to system 104 along with at least the associated voucher identifier or phone number.

System 104, at 440, receives the phone number associated with the voucher identifier sent 435 by system 110 responsive to communication 425, and updates its database 126 record of voucher identifiers and associated legal order identifiers to indicate the phone number associated with the voucher identifier sent at 425 to the telephone service provider. System 104, at 445, receives the recorded telephone call along with at least the associated voucher identifier or phone number sent by system 110 at 445 and system 104 responsively updates database 126 to associate the call recording(s) with the corresponding legal order, voucher identifier and telephone number.

A law enforcement agent may then at 450 listen to and analyze the call, or else at 450 system 104 may perform an automated analysis of the call using a voice recognition process. The automated analysis may produce a transcript or at least a partial transcript of the call or may identify specific key words tending to indicate that the call includes information useful for identifying the criminal, i.e., the person who threatened the victim, causing the victim to purchase credit voucher(s), depending on embodiments of the invention. If the automated analysis by system 104 detects any relevance in the recorded call, program 120 generates an alert 455 to the law enforcement agency, reporting the relevant information such as key words or transcript or partial transcript, so that an agent may use 460 this information in an investigation, which may include reading the key words, transcript or transcript portion or listening to the recorded call, in order to make an informed decision about whether to escalate.

In aspects of embodiments, at 445 system 110 records more than one call and sends their recording to system 104 and presenting the alert 455 includes identifying the calls from the mobile phone for the account to which the credit associated with the voucher identifier was applied.

The usage of the voice recognition process allows monitoring of more criminal communications, by isolating relevant information from small talk. However, it is important to select effective key words, since the criminals may use code words, like "present" to designate a "bomb" or "trip" to "kill". So, human analysis is also important to allow a good usage of the voice recognition automatic tools, when available.

Identifying connections between i) the incident that the victim reported at 415 and ii) the later recorded call at 445 may be useful for conviction of an offender. System 104 provides a way for analysis process 450 to identify significant words and phrases in the later recorded call at 445, which may include code words as in the examples described above, in order to even more clearly make the connection to the caller who made the earlier call reported by the victim. That is, in embodiments of the present invention, at 415 when receiving a report from the victim, system 104 (if victim provides the report directly to the system in automated fashion) or the law enforcement agent (if the victim provides the report to an agent) prompts the victim specifically for words and phrases the victim remembers that the offender used and enters these in the report, with tags indicating that these words and phrases were used by the offender so that the words or phrases can be stored with these tags and easily found later by analysis process 450 for comparison by process 450 to recorded call 445. If analysis process 450 finds the tagged words and phrases from report at 415 in the call recorded at 445, process 450 communicates them to alert 455 process for presentation, e.g. printed report, visual display, etc.

Even if the voice recognition tool is not available, the simple call recording and the identification of the calling phone number will be a relevant information for the police work.

With the association now of a phone number and the credit voucher purchased under duress by the victim, and with a recording in hand of a call originating from that phone number, law enforcement may decide how to handle the investigation using tools already available, such as procedures for responding to phone pranks and terrorist threats. Information provided to law enforcement by the telecommunication service provider is useful and greatly speeds up intervention and reduces the operation cost, making the process effective. According to the seriousness of the crime, law enforcement may i) call the offender, ii) block the mobile phone or iii) review further call recordings to obtain additional evidence for apprehending the offender. In embodiments, for example, law enforcement may communicate to the telecommunication service provider that services the account of the phone having the identified International Mobile Station Equipment Identity number as determined at 435, described herein above, and also may communicate to other telecommunication service providers, an authorization to disable the mobile phone.

As will be appreciated by one skilled in the art, aspects of embodiments of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
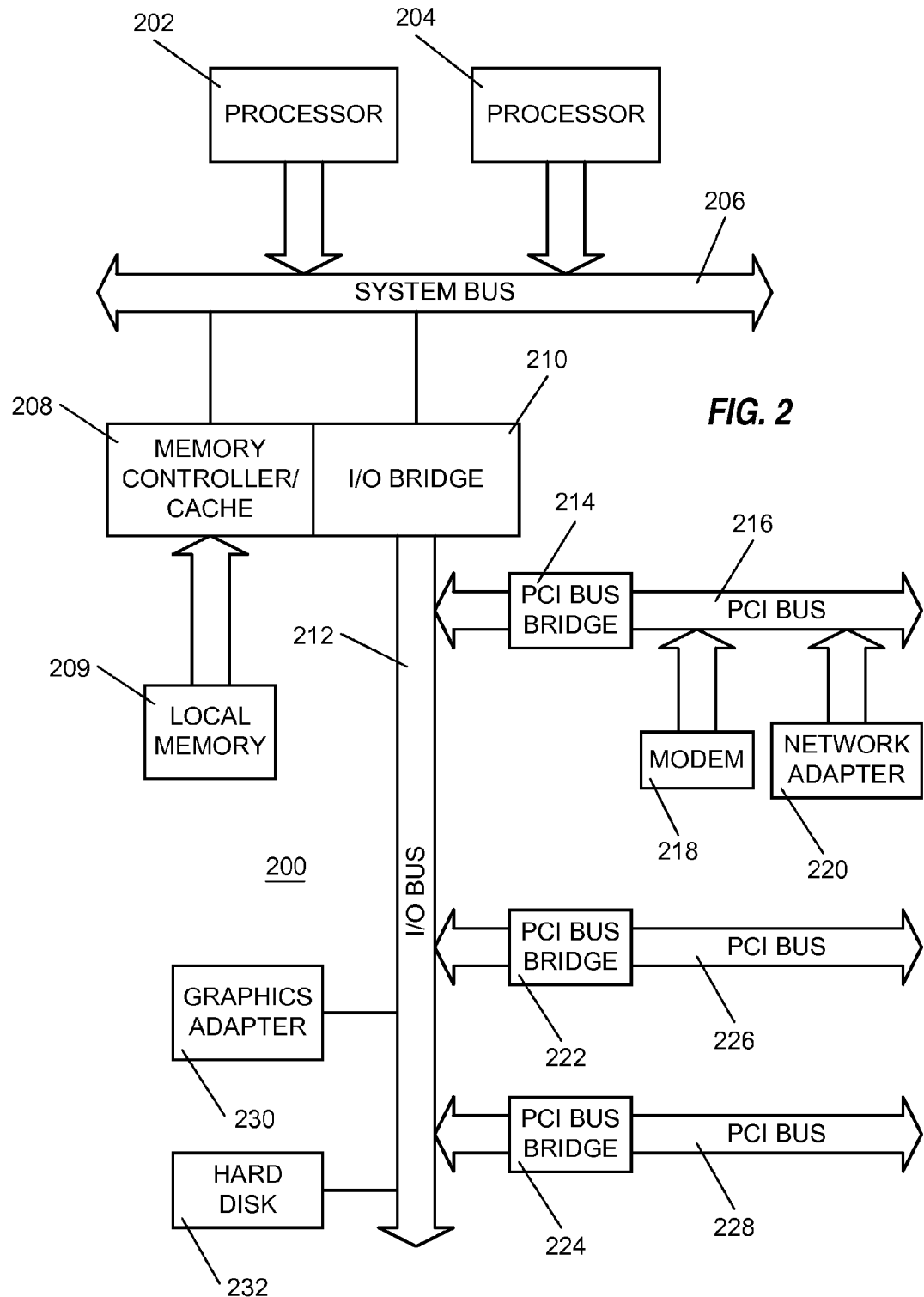
FIG. 2 is a block diagram of a data processing system that may be implemented as a server in which embodiments of the invention may be implemented.

Referring to FIG. 2, a block diagram of a data processing system that may be implemented as a server is depicted in accordance with embodiments of the invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system. However, those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to embodiments of the invention.

System 200 may provide a suitable website or other internet-based graphical user interface accessible by users to enable user interaction for aspects of an embodiment of the invention. In one embodiment, Netscape web server, IBM Websphere Internet tools suite, an IBM DB2 for Linux, Unix and Windows (also referred to as "IBM DB2 for LUW") platform and a Sybase database platform are used in conjunction with a Sun Solaris operating system platform. Additionally, components such as JBDC drivers, IBM connection pooling and IBM MQ series connection methods may be used to provide data access to several sources. The term webpage as it is used herein is not meant to limit the type of documents and programs that might be used to interact with the user. For example, a typical website might include, in addition to standard HTML documents, various forms, Java applets, JavaScript, active server pages (ASP), Java Server Pages (JSP), common gateway interface scripts (CGI), extensible markup language (XML), dynamic HTML, cascading style sheets (CSS), helper programs, plug-ins, and the like.

Figure 3:
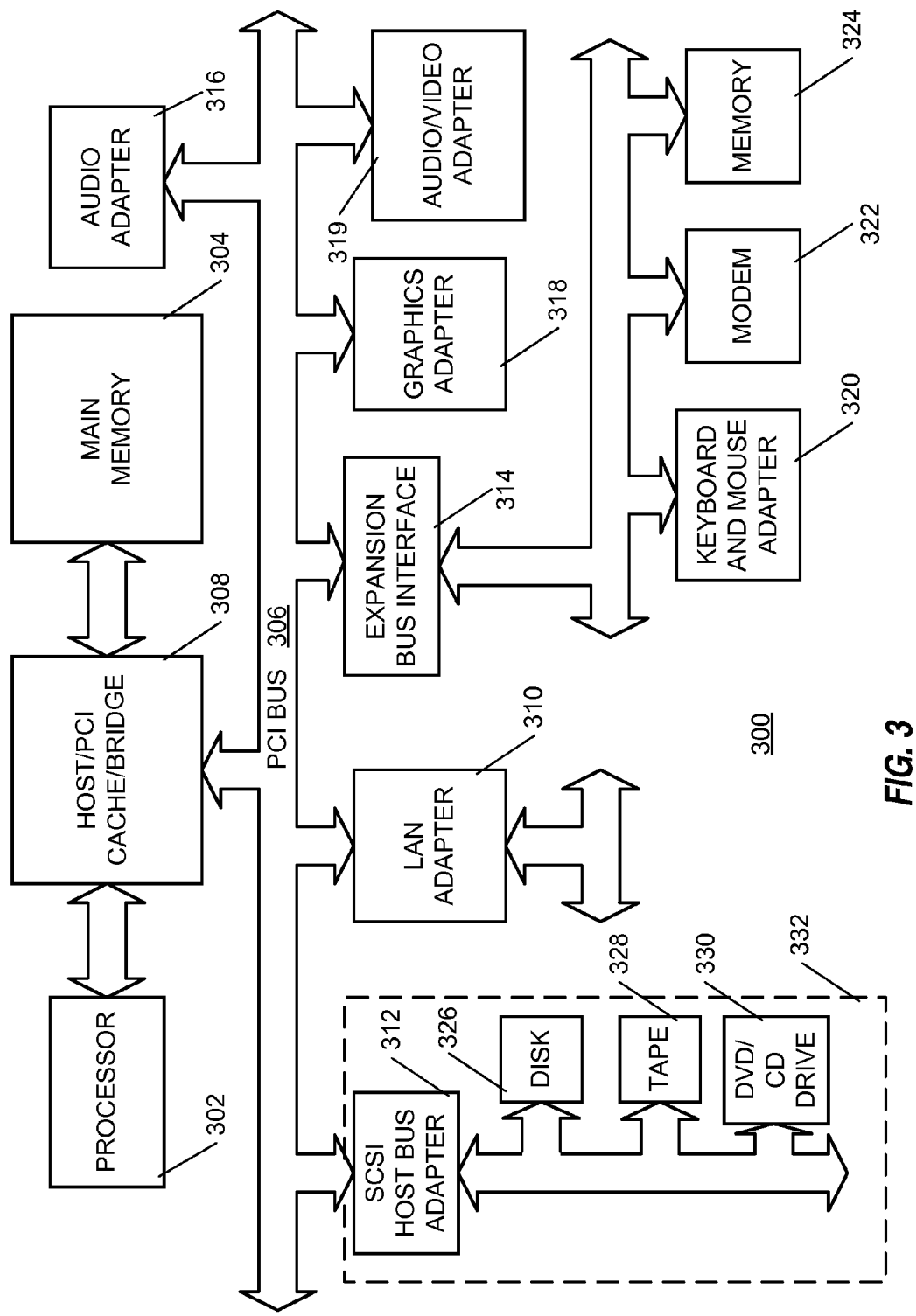
FIG. 3 is a block diagram illustrating a data processing system in which embodiments of the invention may be implemented.

With reference now to FIG. 3, a block diagram illustrating a data processing system is depicted in which embodiments of the invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, Small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots.

Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as a Windows operating system, which is available from Microsoft Corporation. ("Windows" is a trademark of Microsoft Corporation.) An object oriented programming system such as Java may run in conjunction with the operating system and provide calls to the operating system from Java programs or programs executing on data processing system 300. ("Java" is a trademark of Sun Microsystems, Inc.) Instructions for the operating system, the object-oriented operating system, and programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of embodiments of the invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer as well as a PDA. Further, data processing system 300 may also be a kiosk or a Web appliance. Further, embodiments of the invention may reside on any data storage medium (i.e., floppy disk, compact disk, hard disk, tape, ROM, RAM, etc.) used by a computer system. (The terms "computer," "system," "computer system," and "data processing system" and are used interchangeably herein.

Embodiments of the present invention use technologies including:
 Databases, which may be cloud based, to store victim identities and information about threat experienced by victims, voucher identifiers, phone numbers, criminal reports, legal orders, call recordings, etc.
 Gateway network communication between law enforcement all telephone service providers, which avoids manual data handling.
 Software for voice analysis for recorded conversations.
 User interfaces may enable vocal commands.

The small size of mobile phones tend to help make it possible to smuggle them into prisons. The prepaid mobile phone is the cheapest communication device criminals can use and easily replace. A problem for the criminal is how pay for the phone usage, particularly for a phone smuggled into prison. In prison, a criminal does not have much option other than having someone else buy a credit voucher. In some cases, this may mean giving the voucher identifier to the criminal via the prepaid mobile phone itself, since it is able to receive calls even when there is no credit available to originate calls. However, even if the criminal uses a mobile phone to receive a credit voucher identifier, the criminal may then use the credit voucher for a different phone than the one the criminal used to receive the voucher identifier. It should be appreciated that by the communication, data storage and logical processes described herein for embodiments of the present invention, the criminal's phone number may be obtained regardless of whether the criminal gave that number to the victim. Law enforcement benefits from additional tools to reduce crime that are provided by embodiments of the present invention.

Note also that it may be or become possible to purchase and apply a credit voucher to a mobile phone account and to then apply the credit voucher to pay for services other than usage of the phone itself or even to obtain cash. This may tend to further facility criminal activity and increase importance of the investigation efficiencies provided by embodiments of the present invention.

The same way that zero tolerance imposes automatic punishment for infractions of a stated rule in order to eliminate undesirable conduct, embodiments of the present invention help law enforcement to combat this kind of activity. In embodiments of the present invention, when an ordinary citizen reports a kidnapping or other threat, by phone or web service, law enforcement are enabled to instruct the citizen properly and to identify the criminal's prepaid mobile phone number. This allows law enforcement to:
 Request electronic listening authorization of the prepaid mobile phone number, assuming it will be used for malicious purposes;
 Locate the criminal's location using the prepaid mobile phone GPS (when available);
 Request assistance if GPS is not available, such that a mobile phone service provider may use the communication link information between radio towers and mobile phone to restrict the area where the criminal s located; and
 Disable the mobile phone indefinitely, sending a specific command to the prepaid mobile phone which will restrict the communication capability of the criminal.
 Identify security issues in prisons, since many criminals are already behind bars and use threats to obtain credit vouchers for the prepaid mobile phone use in order to continue managing their other criminal activity.

A result is that ordinary citizens will feel safer and more protected by law enforcement and criminal activities may be drastically reduced.

What is claimed is:

1. A method for crime control comprising:
 receiving an incident report for a crime victim notifying a law enforcement agency that the crime victim is under duress to obtain a mobile phone credit voucher due to actions of a criminal suspect;
 tagging words received in the incident report that the crime victim remembers were used by the criminal suspect who coerced the victim to purchase the mobile phone credit voucher;
 providing for the crime victim a voucher identifier for the mobile phone credit voucher, wherein the mobile phone credit voucher is configured for charging up a mobile phone with calling time and wherein the phone number for the mobile phone is unknown to the crime victim and the law enforcement agency;
 generating a request for a legal order directing a telecommunication service provider to obtain information about use of the mobile phone credit voucher;
 receiving approval for the legal order and transmitting the legal order and the voucher identifier, by a law enforcement agency computer system via a network, to a computer system of the telecommunication service provider;
 receiving, via the network from the telecommunication service provider computer system, a phone number associated with the mobile phone to which a credit associated with the voucher identifier was applied and a recording of a telephone call to or from the phone number; and
 performing an automated analysis of the telephone call by a voice recognition process of the law enforcement agency computer system comprising:
 retrieving the received words by respective tags;
 comparing the received words with the recording of the telephone call to identify at least specific words indicating that the telephone call includes information useful for apprehending a person who coerced the victim to purchase the identified credit voucher; and identifying connections between the incident report from the crime victim and the recording of the telephone call.

2. The method of claim 1 comprising:
presenting an alert by the law enforcement agency computer system responsive to the automated analysis.

3. The method of claim 2, wherein presenting the alert includes presenting the alert responsive to the automated analysis identifying at least predetermined key words used by the criminal suspect relating to an earlier call reported by the victim.

4. The method of claim 2, wherein presenting the alert includes identifying a plurality of calls from the mobile phone for the account to which the credit associated with the voucher identifier was applied.

5. The method of claim 1, comprising:
receiving from the telecommunication service provider an International Mobile Station Equipment Identity number of the mobile phone to which the credit associated with the voucher identifier was applied.

6. The method of claim 5, comprising:
communicating to other telecommunication service providers authorization to disable the mobile phone having the identified International Mobile Station Equipment Identity number.

7. A system comprising:
at least one computing processor; and
a non-transitory computer-readable storage media connected to the at least one computing processor, wherein the computer-readable storage media has stored thereon a program for controlling the at least one computing processor to perform crime control actions, and wherein the at least one computing processor is operative with the program to execute the program to:
receive an incident report for a crime victim notifying a law enforcement agency that the crime victim is under duress to obtain a mobile phone credit voucher due to actions of a criminal suspect;
tag words received in the incident report that the crime victim remembers were used by the criminal suspect who coerced the victim to purchase the mobile phone credit voucher;
provide for the crime victim a voucher identifier for the mobile phone credit voucher, wherein the mobile phone credit voucher is configured for charging up a mobile phone with calling time and wherein the phone number for the mobile phone is unknown to the crime victim and the law enforcement;
generate a request for a legal order directing a telecommunication service provider to obtain information about use of the mobile phone credit voucher;
receive approval for the legal order and transmit the legal order and the voucher identifier, by a law enforcement agency computer system via a network, to a computer system of the telecommunication service provider;
receive, via the network from the telecommunication service provider computer system, a phone number associated with the mobile phone to which a credit associated with the voucher identifier was applied and a recording of a telephone call to or from the phone number; and
perform an automated analysis of the telephone call by a voice recognition process of the law enforcement agency computer system comprising:
retrieving the received words by respective tags;
comparing the received words with the recording of the telephone call to identify at least specific words indicating that the telephone call includes information useful for apprehending a person who coerced the victim to purchase the identified credit voucher; and
identifying connections between the incident report from the crime victim and the recording of the telephone call.

8. The system of claim 7, wherein the at least one computing processor is operative with the program to execute the program to present an alert by the law enforcement agency computer system responsive to the automated analysis.

9. The system of claim 8, wherein presenting the alert includes presenting the alert responsive to the automated analysis identifying at least predetermined key words used by the criminal suspect relating to an earlier call reported by the victim.

10. The system of claim 8, wherein presenting the alert includes identifying a plurality of calls from the mobile phone for the account to which the credit associated with the voucher identifier was applied.

11. The system of claim 8 wherein the at least one computing processor is operative with the program to execute the program to receive from the telecommunication service provider an International Mobile Station Equipment Identity number of the mobile phone to which the credit associated with the voucher identifier was applied.

12. The system of claim 7, wherein the at least one computing processor is operative with the program to execute the program to communicate to other telecommunication service providers authorization to disable the mobile phone having the identified International Mobile Station Equipment Identity number.

13. A computer program product for crime control, the computer program product comprising:
a non-transitory computer-readable storage medium; and
computer-readable program code embodied in the computer-readable storage medium, wherein the computer-readable program code is configured to cause at least one computing processor to:
receive an incident report for a crime victim notifying a law enforcement agency that the crime victim is under duress to obtain a mobile phone credit voucher due to actions of a criminal suspect;
tag words received in the incident report that the crime victim remembers were used by the criminal suspect who coerced the victim to purchase the mobile phone credit voucher;
provide for the crime victim a voucher identifier for the mobile phone credit voucher, wherein the mobile phone credit voucher is configured for charging up a mobile phone with calling time and wherein the phone number for the mobile phone is unknown to the crime victim and the law enforcement agency;
generate a request for a legal order directing a telecommunication service provider to obtain certain information about use of the mobile phone credit voucher;
receive approval for the legal order and transmitting the legal order and the voucher identifier, by a law enforcement agency computer system via a network to a computer system of the telecommunication service provider;
receive, via the network from the telecommunication service provider computer system, a phone number associated with the mobile phone to which a credit associated with the voucher identifier was applied and a recording of a telephone call to or from the phone number; and
perform an automated analysis of the telephone call by a voice recognition process of the law enforcement agency computer system comprising:
retrieving the received words by respective tags;
comparing the received words with the recording of the telephone call to identify at least specific words indicating that the telephone call includes information useful for apprehending a person who coerced the victim to purchase the identified credit voucher; and identifying connections between the incident report from the crime victim and the recording of the telephone call.

14. The computer program product of claim 13 wherein the computer-readable program code is configured to cause at least one computing processor to present an alert by the law enforcement agency computer system responsive to the automated analysis.

15. The computer program product of claim 14, wherein presenting the alert includes presenting the alert responsive to the automated analysis identifying at least predetermined key words used by the criminal suspect relating to an earlier call reported by the victim.

16. The computer program product of claim 14, wherein presenting the alert includes identifying a plurality of calls from the mobile phone for the account to which the credit associated with the voucher identifier was applied.

17. The computer program product of claim 13 wherein the computer-readable program code is configured to cause at least one computing processor to execute the program to receive from the telecommunication service provider an International Mobile, Station Equipment Identity number of the mobile phone to which the credit associated with the voucher identifier was applied.

18. The computer program product of claim 17, wherein the computer-readable program code is configured to cause at least one computing processor to communicate to other telecommunication service providers authorization to disable the mobile phone having the identified International Mobile Station Equipment Identity number.

* * * * *